US005939196A

United States Patent [19]

Perret et al.

[11] Patent Number: 5,939,196

[45] Date of Patent: Aug. 17, 1999

[54] COATING FOR METAL SURFACES AND METHOD FOR IMPLEMENTING IT

[75] Inventors: Patrice Perret, Serquigny; Régis Jacquemet, Evreux; Lucien Murino, Bernay, all of France

[73] Assignee: ELF Atochem S.A., Puteaux, France

[21] Appl. No.: 08/810,579

[22] Filed: Mar. 4, 1997

[30] Foreign Application Priority Data

Mar. 5, 1996 [FR] France .................................. 96 02766

[51] Int. Cl.[6] .............................. B32B 27/38; F16L 11/00

[52] U.S. Cl. .......................... 428/413; 428/414; 428/418; 428/500; 428/515; 428/516; 138/145

[58] Field of Search .................................... 428/413, 418, 428/500, 515, 516, 414; 138/141, 145, 146

[56] References Cited

U.S. PATENT DOCUMENTS 4,213,486 7/1980 Samour et al. ......................... 138/143
4,606,953 8/1986 Suzuki et al. ............................. 428/36

FOREIGN PATENT DOCUMENTS

A-0346101 12/1989 European Pat. Off. .

OTHER PUBLICATIONS

R.G.Galka: “Internal & External Protection of Pipe, Proceedings of the 8th International Conference (Florence, Italy, Oct. 24–26 1989)” 1990, BHRA (Information Services), Bedford UK XP002019024 21876, pp. 179–188.

*Primary Examiner*—Paul Thibodeau
*Assistant Examiner*—Holly C. Rickman

[57] ABSTRACT

The invention provides a coating for a metal surface comprising (i) a primer able to gel and set, (ii) an adhesive and (iii) a thermoplastic polymer, in which said adhesive contains a catalyst, as well as metal objects, particularly pipes, provided with this surface coating, and a method for applying the surface coating.

30 Claims, No Drawings

COATING FOR METAL SURFACES AND METHOD FOR IMPLEMENTING IT

TABLE OF CONTENTS

1. Background of The Invention
1.1 Technical Field
1.2 Description of The Related Art
2. Summary of The Invention
3. Description of The Invention
4. Description of The Preferred Embodiments
5. Claims
6. Abstract of The Disclosure

1. BACKGROUND OF THE INVENTION

1.1 Technical Field

The present invention relates to a novel coating for metal surfaces and a method for implementing the coating. The invention particularly relates to a three-layer coating for metal surfaces, comprising a primary epoxy layer, an adhesive layer and a polyolefin layer. The invention also relates to a method for coating metal surfaces.

1.2 Description of The Related Art

Three-layer coatings for metal surfaces are already known in the related art, notably for coating metal tubes. The first layer consists of an epoxy primer which initially forms a gel and then cross-links or sets. The second layer consists of a polymer adhesive, and is generally arranged over the primer before the latter gels. The third layer generally consists of a thermoplastic polymer, most frequently a polyolefin.

Thus, the following patents disclose such three-layer systems, which enable the advantages of epoxy resins and polyolefins to be combined, specifically high adherence, good shock resitance and cathodic disbondment resistance: EP-A-0057823, EP-A-0205395, FR-A-2184321, and FR-A-2529829. However, in these patents, there is no mention of problems associated with epoxy/adhesive reactivity and to the time that passes between application of the epoxy layer and the adhesive layer.

WO-92/03234 discloses a method for coating metal tubes in which the adhesive is applied over a partially cross-linked epoxy resin so as to favor epoxy/adhesive reactions and thus adhesion. It is additionally recommended to apply the adhesive before cross-linking, but after the epoxy gels. However, no example or numerical value is given.

Additionally, when the adhesive is arranged over the epoxy primer after it gels, salt water endurance tests show that, in the case of these conventional three-layer systems, total disbondment occurs at the metal/epoxy interface, accompanied by significant corrosion. It is essential to avoid this negative effect in many applications, notably the transport of hydrocarbons through underwater pipes. If, on the other hand, the adhesive is arranged over the primer after the latter gels, then salt water endurance tests show that no more disbondment occurs at the metal/epoxy interface, nor does the associated corrosion; however, this time, disbondment at the epoxy/adhesive interface is observed.

There is thus a need for coatings that simultaneously have good adhesion and good water endurance properties.

It appears from the related art that the choice of the epoxy/adhesive pair is an essential parameter. Indeed, to obtain high adhesion between the epoxy primer and the adhesive, the latter must be applied rapidly before the primer gels in order to ensure a high level of reaction with the epoxy primer. This means that the time between application of the epoxy and adhesive layers must be relatively short, and below the gelling time of the primer. This criterion is sometimes difficult to satisfy on industrial production lines as a result of their design (proportioning of application equipment, linear speed of the tube) or for large-diameter coating (low rotational speed and linear speed of the tube). There is thus an unmet need for adhesive compositions having high adhesion which is independent of the nature and origin of the primer and/or of the thermoplastic polymer, and also high adhesion which is independent of the time of application between the epoxy-adhesive layers.

2. SUMMARY OF THE INVENTION

The above problems are resolved in a surprising manner by the invention. Thus, the present invention provides a coating for a metal surface comprising:

(i) a primer layer able to gel and to set;

(ii) an adhesive layer; and (iii) a thermoplastic polymer layer; in which said adhesive comprises a catalyst.

According to one embodiment, said adhesive is a polymer functionalized by grafting or copolymerization with a functional monomer chosen from:

(i) unsaturated carboxylic acids (ii) unsaturated dicarboxylic acid anhydrides (iii) derivatives of these acids or anhydrides, or (iv) unsaturated epoxides.

According to one embodiment, said adhesive is a copolymer of:

(i) ethylene, (ii) optionally, one or several monomers selected from:
unsaturated carboxylic acid esters,
vinyl esters of saturated carboxylic acids, and
alpha-olefins, and said functional monomer(s) being copolymerized.

In a further embodiment, the said adhesive is an ethylene/C1–C4 alkyl (meth)acrylate/maleic anhydride terpolymer.

According to another embodiment, said adhesive is polyethylene grafted with maleic anhydride or polypropylene grafted with maleic anhydride.

In another further embodiment, said catalyst is present in an amount of 0.005% to 2.5% by weight based on the adhesive weight.

In an additional embodiment, said catalyst is 1,4-diazabicyclo[2,2,2] octane (DABCO) or methyl-2-imidazole (M2ID).

In a further additional embodiment, said primer is an epoxy primer.

In yet a further embodiment, said thermoplastic polymer is polyethylene or polypropylene.

3. DESCRIPTION OF THE INVENTION

The invention is now described in detail in the description that follows.

The primer is any conventional primer used in the art of three-layer coating. Examples that can be mentioned are epoxy, polyester or acrylic resins. Conventionally, an epoxy resin is used with advantage.

Principal epoxy resins are, for example, described in the Kirk-Othmer Encyclopedia of Chemical Technology, 3rd Ed. vol. 9, pp. 267–289, These resins are most frequently polyphenol polyglycidylethers.

One, for example, can use:

condensation products of bisphenol A and epichlorhydrine;

- epoxy-cresol novolac (ECN) resins;
- epoxy phenol novolacs;
- resins derived from bisphenol F;
- derivatives of polynuclear phenols and glycidyl-ethers;
- cycloaliphatic resins;
- resins derived from aromatic amines such as:
  - tetraglycidylmethylenedianiline derivatives; triglycidyl-p-aminophenol derivatives, triazine derivatives such as triglycidyl isocyanate;
  - resins derived from hydantoin.

The epoxy resins used in the present invention can be resins able to cross-link at elevated temperatures, typically from 160° C. to 250° C., conventionally from 180 to 220° C. The epoxy resins could also be resins able to cross-link at ambient temperature, with, for example, amines or amides.

The gelling time of these primers or epoxy resins can be between 15 and 45 sec., for example between 20 and 30 sec., at the temperature at which said epoxy resin is applied. Gelling time is determined as in Association Francaise de Normalisation (AFNOR) standard NFA 49-706; it is the time needed to bring about a rapid increase in viscosity at a determined temperature.

The glass transition temperature, Tg, is conventionally comprised between 80° C. and 120° C.

These primers, typically epoxy resins, can be deposited in powder or liquid form on the metal surface, by conventional techniques.

In this application, the term "adhesive" stands for products commonly known as (co-extrusion) binders, thermoplastic binders, hot-melt bonding agents, etc.

By way of examples, one can cite (co)polyolefins modified with an unsaturated carboxylic acid derivative (modification being by copolymerization, terpolymerization or grafting). For the adhesive, certain functionalized polyolefins can also be employed provided that the functional group content is sufficient to ensure adhesion between the layer. Mixtures of adhesives are also suitable.

Examples of such adhesives are given in the following patents, this list being non-limiting: EP-A-210307; EP-A-33220; EP-266994; FR-A-2132780; EP-A-171777; U.S. Pat. Nos. 4,758,477; 4,762,890; 4,966,810; 4,452,942; and 3,658,948.

Examples of such adhesives are:

- copolymers of ethylene copolymerized with butene, hexene, octene, optionally mixed with ethylene-propylene copolymers, grafted with maleic anhydride, said ethylene/alpha-olefin copolymers containing, for example, 35 to 80% by weight ethylene, the anhydride grafting ratio being comprised between 0.01 and 1% by weight, for example between 0.05 and 0.5% based on the total weight of the polymer;
- copolymers of ethylene and vinyl acetate (EVA), with or without addition of maleic anhydride (the maleic anhydride being grafted or terpolymerized), containing more particularly up to 40% by weight of vinyl acetate, 0.01 to 1% by weight grafted maleic anhydride or 0.1 to 10% by weight terpolymerized maleic anhydride, based on the total copolymer weight;
- polyolefins such as polyethylene (LLDPE, LDPE, VLDPE, etc.) or polypropylene, the polyolefins being grafted with a carboxylic acid derivative such as maleic anhydride, the grafting ratio being comprised between 0.005% and 1% by weight;
- terpolymers of ethylene and alkyl (meth) acrylate (such as methyl, ethyl or butyl acrylate) and maleic anhydride containing up to 40% by weight of alkyl (meth)acrylate and 0.01 to 10% by weight of maleic anhydride, based on the total terpolymer weight, the maleic anhydride being grafted or copolymerized.

The grafted polyethylenes and polypropylenes, and the terpolymers of ethylene/alkyl (meth)acrylate/maleic anhydride are the preferred adhesive in this invention.

The adhesives can be mixed with each other or with polyethylenes (VLDPE, LLDPE, LDPE, etc.).

The term "catalyst" as used in this invention stands for any compound able to speed up the reaction at the epoxy-adhesive interface between the remaining epoxy functions and the functional groups present on the adhesive.

As examples of the catalyst, we can mention: 1,4-diazabicyclo[2,2,2] octane (DABCO), methyl-2-imidazole (M2ID), $H_3BO_3$, stearic acid, calcium stearate, $B_4Na_2O_7$ (Borax), $NaH_2PO_4$, $Sb_2O_3$, tri-(nonyl-phenyl)-phosphite (hereafter "TNPP"), paratoluene sulfonic acid (hereafter "APTS"), dibutyl tin dilaurate (hereafter "DLBBE") etc.

The catalyst is added in an amount sufficient to catalyze the reaction at the interface. Generally speaking, the catalyst is effective at very low concentrations, for example 0.005% by weight, based on the adhesive weight. The concentration able to be used in the present invention is from 0.005 to 2.5% by weight, advantageously from 0.01 to 1% by weight, for example between 0.05 and 0.5% by weight based on the adhesive weight.

The catalyst is added to the adhesive by all means known in the art, such as for example compounding, carried out at a suitable temperature depending on the components.

The thermoplastic polymer employed in the present invention is any thermoplastic conventionally used in the art.

Examples of suitable thermoplastic polymers are the polyamides, polyolefins, polyamide alloys and their mixtures. The thermoplastic polymer layer can additionally contain conventional fillers, such as glass fibers.

Here, the term polyamide stands for the condensation products of:

- one or several alpha-omega-amino acids such as those containing more than 5 carbon atoms, for example from 6 to 12 carbon atoms; or
- one or several lactames corresponding to the above amino-acids; or
- one or several substantially stoichiometric combinations of one or several aliphatic and/or cycloaliphatic and/or aromatic-aliphatic diamines, or salts thereof, with one or several aliphatic or aromatic carboxylic diacids or salts thereof; or
- any mixture of the above monomers; and
- any mixture of the resulting condensation products, optionally with other polymers compatible with the polyamides.

By way of example, the polyamide is PA6 (or nylon 6), or PA6,6 (or nylon 6,6).

Here, the term "polyolefin" comprises homopolymers or copolymers of alpha-olefins or di-olefins.

Such olefins are, by way of example, ethylene, propylene, butene-1, octene-1, and butadiene.

The following can be mentioned as typical examples:

- polyethylene (PE), polypropylene (PP), and copolymers of ethylene and alpha-olefins. Such polymers can be grafted or copolymerized with unsaturated carboxylic acid anhydrides, such as maleic anhydride, or unsaturated epoxides, such as glycidyl methacrylate.
- copolymers of ethylene with one or several products selected from: (i) unsaturated carboxylic acids and salts or esters thereof; (ii) saturated carboxylic acid vinyl esters such as vinyl acetate; (iii) unsaturated di-carboxylic acids and salts, esters, hemiesters, and anhydrides thereof; and (iv) unsaturated epoxides. These ethylene (co)polymers can be grafted with unsaturated carboxylic acid anhydrides or unsaturated epoxides.

styrene-based block copolymers, and notably those comprising polystyrene and polybutadiene sequences (SBS), polystyrene and polyisoprene sequences (SIS), polystyrene and poly(ethylene-butylene) sequences (SEBS), such copolymers optionally being functionalized with maleic anhydride.

The above copolymers can be randomly copolymerized or sequenced into blocks, and have a linear or branched structure.

The term "polyolefin" as used herein also covers mixtures of several of the polyolefins mentioned above.

One can, for example, use the following in this invention: polyethylene (HDPE, MDPE, LDPE or VLDPE), or polypropylene.

The molecular weight of the polyolefins can vary over a wide range as will be understandable to those skilled in the art.

When the thermoplastic is polyethylene, an ethylene-based adhesive is for example used, whereas when the thermoplastic is polypropylene, a propylene-based adhesive is for example used.

"Alloys" as use herein should be taken to mean products comprising a polyamide such as described above, polyolefin such as described above and, when the latter does not have sufficient functionality to ensure compatibility with the polyamide, a compatibilizing agent; the polyolefin is present in the form of a phase dispersed in the polyamide phase, which is thus referred to as a polyamide matrix. For example, the polyamide represents from 25 to 75% by weight of the alloy.

The compatibilizing agent is present in a sufficient amount to ensure compatibility, meaning dispersion of the polyolefin in the polyamide matrix in the form of nodules, for example, up to 25% by weight of the polyolefin. Nodule diameter can be 0.1 to 5 $\mu$m.

The compatibilizing agent is a product known per se for rendering polyamides and polyolefins compatible, for example as described in the following patent applications: FR-A-2291225, EP-A-0342066 and EP-A-0218665 the content of which is incorporated herein by reference. The thickness of the primer layer can be comprised between 20 and 400 $\mu$m, for example between 50 and 150 $\mu$m. The thickness of the adhesive layer can be comprised between 100 and 500 $\mu$m, for example between 200 and 350 $\mu$m. The thickness of the thermo-plastic layer can be comprised between 0.5 and 5 mm, for example between 1.5 and 3 mm.

The invention also covers the case where conventional additives and/or fillers such as $CaCO_3$, talc or mica, silicones, anti-UV agents, pigments such as $TiO_2$, Feox or carbon black, stabilizers, fireproofing agents, etc. are added to the primer, the adhesive or the thermoplastic.

The present invention also provides a method for applying a coating according to the invention comprising the steps consisting of:

(i) applying a primer;

(ii) applying an adhesive; and (iii) applying a thermoplastic polymer.

Prior to applying the primer, the metal surface is conventionally degreased, optionally shot-blasted or sand-blasted, and heated. The pretreatment (shot or sand-blasting) increases surface roughness and encourages keying of the primer, that is better adhesion of the primer to the metal surface.

Step (i) is carried out by depositing the primer in liquid form or, if the primer is in powder form, by projection, for example by electrostatic spray projection, deposition taking place on the heated metal surface.

Step (ii) is implemented by depositing adhesive in the molten state on the primer layer, for example after hardening of the primer, or prior to hardening but after gelling of the primer, or prior to gelling of the primer. Conventionally, the adhesive is extruded and applied in film form, or projected or sprayed if it is in powder form.

Step (iii) is carried out by depositing the thermoplastic on the adhesive. Conventionally, the thermoplastic is extruded then applied in film form by a banding operation.

The thus-coated tube can then be submitted to a pressing operation, using rollers, for example. The tube can then be cooled in a cooling chamber using, for example, a water spray. The time between applying the primer and cooling should be sufficient to ensure complete cross-linking or setting of the epoxy primer, this being indicative of good anti-corrosion behavior (verification that $\Delta Tg \leqq 5°$ C. according to French standards NFA 49710 or NFA 49711).

In one advantageous embodiment of the method of the invention, the adhesive is applied before the primer sets, but after the primer gels. The expression "after the primer gels" includes very brief periods, meaning immediately after at least partially gelling, but also includes longer periods as well, for example, which can be on the order of the primer gel time.

The present invention also provides a metallic object, the surface of which is coated using a coating according to the invention and, in particular, a metallic tube. This metal tube has a diameter of up to 0.8 m, and even up to 2.5 m, and a wall thickness of 2 to 50 mm. Metal tubes with the coating according to the invention are completely suitable for transporting hydrocarbons, gas or water, such tubes being able to be buried and/or immersed.

The invention is illustrated in the following examples which should in no case be considered as limiting.

4. DESCRIPTION OF THE PREFERRED EMBODIMENT

EXAMPLES

In the following examples, a production line is employed enabling steel tubes of outer diameter 11.4 cm and 5.5 mm wall thickness to be coated.

Several types of epoxy primer are employed, specifically:

epoxy 1: available from Bitumes Spéciaux under the general reference EUROKOTE® and having the following characteristics:

specific gravity 1.50 g/ml; Tg=105° C., gelling time 45 sec at 180° C.; minimum and maximum substrate temperatures 180 and 220° C. respectively, a hardening profile such that hardening time at 180° C. is about 60 sec and at 220° C. is about 20 sec.

epoxy 2: available from Bitumes Spéciaux under the general reference EUROKOTE® and having the following characteristics:

specific gravity 1.50 g/ml; Tg=105° C., gelling time 80 sec at 180° C.; minimum and maximum substrate temperatures 180 and 220° C. respectively, a hardening profile such that hardening time at 180° C. is about 180 sec and at 220° C. is about 60.

epoxy 3: available from BASF under the name BASEPOX® PE 508190, and having the following characteristics:

specific gravity 1.49 g/ml, gelling time 40 sec at 180° C.; minimum and maximum substrate temperatures 180 and 210° C. respectively.

epoxy 4: available from Zhong Yuan Oil Field Construction Chemical Industry Co. under the name BEAUTÉ ETERNELLE®, and having the following characteristics:

specific gravity 1.2–1.4 g/ml; gelling time 38 sec at 180° C.; minimum and maximum substrate temperatures 180 and 210° C. respectively.

epoxy 5: available from Langfang Yannei Chemical Co. Ltd under the name PEY2® and having the following characteristics:

specific gravity 1.2–1.4 g/ml; gelling time 25 sec at 180° C.; minimum and maximum substrate temperatures 180 and 210° C. respectively.

epoxy 5: available from Langfang Yannei Chemical Co. Ltd. under the name PEY2® and having the following characteristics:

specific gravity 1.2–1.4 g/ml; gelling time 25 sec at 180° C.; minimum and maximum substrate temperatures 180 and 210° C. respectively.

Several types of adhesive are used, which will or will not be mixed with various types of catalyst, specifically:

adhesive 1: available from Elf Atochem under the general name LOTADER®, which is an ethylene/butyl acrylate/maleic anhydride terpolymer in a weight ratio of 91/6/3, and a melt flow index MFI of 5 g/10 min (at 190° C. under 2.16 kg load);

adhesive 2: available from Elf Atochem under the general name LOTADER®, which is mixture of 55% by weight of an ethylene/butyl acrylate/maleic anhydride terpolymer in a weight ratio of 93.5/6/0.5 and an MFI of 2 g/10 min (at 190° C. under 2.16 kg) and 45% by weight of VLDPE of density 0.910 g/ml and MFI of 0.9 g/10 min (at 190° C. under 2.16 kg);

adhesive 3: available from Elf Atochem under the general name OREVAC® which is a polypropylene grafted with maleic anhydride at a grafting rate of 0.15% by weight of polypropylene and having an MFI of 2 g/10 min (at 190° C. under 2.16 kg);

Several types of thermoplastic polymer are used, here polyolefins, the thermoplastic layer being referred to as the top-coat, specifically:

top-coat 1: polyethylene available from Elf Atochem under the general name LACQTÉNE®, low density (LDPE) having a melt flow index MFI of 0.25 g/10 min (at 190° C. under 2.16 kg) and a density of 0.934 g/ml, containing a heat stabilizer and an anti-UV agent;

top-coat 2: polyethylene available from Elf Atochem under the general name LACQTÉNE®, medium density (MDPE) having a melt flow index MFI of 0.3 g/10 min (at 190° C. under 2.16 kg) and a density of 0.937 g/ml containing a thermal stabilization and an anti-UV agent;

top-coat 3: polyethylene available from UCC, high density (HDPE) having a melt flow index MFI of 0.6 g/10 min (at 190° C. under 2.16 kg) and a density of 0.943 g/ml, containing a thermal stabilization and an anti-UV agent;

top-coat 4: polypropylene available from Hoechst, under the name HOSTALEN®, having a melt flow index MFI of 1 g/10 min (at 230° C. under 2.16 kg) and a density of 0.9 g/ml containing a thermal stabilization and an anti-UV agent.

The coating is applied using the following method: heat the tube; electrostatic spray projection of the epoxy onto the tube; extrusion of the adhesive over the epoxy; extrusion of the thermoplastic over the adhesive; roller pressing; cooling by water spray.

Peel-off strength is measured by peeling at 180° at ambient temperature and at elevated temperatures and at a rate of 100 m/min over a 5 cm width. 5 tests were done and the mean value is reported.

Example 1

In this example, two systems are compared: one in which the adhesive does not contain a catalyst and the other in which the adhesive contains a catalyst. The catalyst is DABCO, added in an amount of 0.25% by weight based on the weight of adhesive. The adhesive/catalyst mixture is obtained by compounding the components at 130°–140° C.

Adhesion, in the form of the peel-off force or peel strength, is then determined, for variable times between application of the epoxy and application of the adhesive (hereafter, epoxy/adhesive times).

TABLE 1a

| epoxy/adhesive time 22–25 seconds | | | | |
|---|---|---|---|---|
| | temperature | material | thickness | time |
| tube | 180° C. | — | — | — |
| layer 1 | 180° C. | epoxy 1 | 70 μm | — |
| layer 2 | 225° C. | adhesive 1 | 250–300 μm | — |
| layer 3 | 210° C. | top-coat 1 | 2.5 mm | — |
| epoxy gel time at 180° C. | | | | 45 s |
| epoxy/adhesive time | — | — | — | 22–25 s |
| epoxy/cooling time | — | — | — | 90 s |

TABLE 1b

| | Peel strength | |
|---|---|---|
| Temperature | Peel-off force without catalyst | (N/5 cm) with catalyst |
| 23° C. | 1071 | 945 |
| 50° C. | 600 | 663 |
| 70° C. | 300 | 326 |

TABLE 2a

| epoxy/adhesive time 45 seconds | | | | |
|---|---|---|---|---|
| | temperature | material | thickness | time |
| tube | 180° C. | — | — | |
| layer 1 | 180° C. | epoxy 1 | 70 μm | |
| layer 2 | 225° C. | adhesive 1 | 250–300 μm | — |
| layer 3 | 210° C. | top-coat 1 | 2.5 m | — |
| epoxy gel time at 180° C. | — | — | — | 45 s |
| epoxy/adhesive time | — | — | — | 45 s |
| epoxy/cooling time | | | | 110 s |

TABLE 2b

| Temperature | Peel strength<br>Peel-off force without catalyst | (N/5 cm) with catalyst |
|---|---|---|
| 23° C. | 909 | 1233 |
| 50° C. | 515 | 682 |
| 70° C. | 240 | 350 |

TABLE 3a

| epoxy/adhesive time 60 seconds | temperature | material | thickness | time |
|---|---|---|---|---|
| tube | 180° C. | — | — | — |
| layer 1 | 180° C. | epoxy 1 | 70 μm | — |
| layer 2 | 225° C. | adhesive 1 | 250–300 μm | — |
| layer 3 | 210° C. | top-coat 1 | 2.5 mm | — |
| epoxy gel time at 180° C. | | | | 45 s |
| epoxy/adhesive time | — | — | — | 60 s |
| epoxy/cooling time | — | — | — | 125 s |

TABLE 3b

| Temperature | Peel strength<br>Peel-off force without catalyst | (N/5 cm) with catalyst |
|---|---|---|
| 23° C. | 40 | 1156 |
| 50° C. | 448 | 725 |
| 70° C. | 255 | 375 |

Example 2

In this example, two systems are compared: one in which the adhesive does not contain a catalyst and the other in which the adhesive contains a catalyst. The catalyst is DABCO added in an amount of 0.25% by weight based on the adhesive weight. The adhesive/catalyst mixture is obtained by compounding the components at 130°–140° C. Adhesion is then determined for variable epoxy/adhesive times.

TABLE 4a

| epoxy/adhesive time 22–25 seconds | temperature | material | thickness | time |
|---|---|---|---|---|
| tube | 200° C. | — | — | — |
| layer 1 | 200° C. | epoxy 2 | 70 μm | — |
| layer 2 | 225° C. | adhesive 1 | 250–300 μm | — |
| layer 3 | 210° C. | top-coat 1 | 2.5 mm | — |
| epoxy gel time at 200° C. | | | | 45 s |
| epoxy/adhesive time | — | — | — | 22–25 s |
| epoxy/cooling time | — | — | — | 90 s |

TABLE 4b

| Temperature | Peel strength<br>Peel-off force without catalyst | (N/5 cm) with catalyst |
|---|---|---|
| 23° C. | 723 | 1132 |
| 50° C. | 665 | 731 |
| 70° C. | 400 | 278 |

TABLE 5a

| epoxy/adhesive time 45 seconds | temperature | material | thickness | time |
|---|---|---|---|---|
| tube | 200° C. | — | — | — |
| layer 1 | 200° C. | epoxy 2 | 70 μm | — |
| layer 2 | 225° C. | adhesive 1 | 250–300 μm | — |
| layer 3 | 210° C. | top-coat 1 | 2.5 mm | — |
| epoxy gel time at 180° C. | | | | 45 s |
| epoxy/adhesive time | — | — | — | 45 s |
| epoxy/cooling time | — | — | — | 110 s |

TABLE 5b

| Temperature | Peel strength<br>Peel-off force without catalyst | (N/5 cm) with catalyst |
|---|---|---|
| 23° C. | 278 | 1102 |
| 50° C. | 257 | 711 |
| 70° C. | 157 | 312 |

TABLE 6a

| epoxy/adhesive time 60 seconds | temperature | material | thickness | time |
|---|---|---|---|---|
| tube | 200° C. | — | — | — |
| layer 1 | 200° C. | epoxy 2 | 70 μm | — |
| layer 2 | 225° C. | adhesive 1 | 250–300 μm | — |
| layer 3 | 210° C. | top-coat 1 | 2.5 mm | — |
| epoxy gel time at 180° C. | | | | 45 s |
| epoxy/adhesive time | — | — | — | 60 s |
| epoxy/cooling time | — | — | — | 125 s |

TABLE 6b

| Temperature | Peel strength<br>Peel-off force without catalyst | (N/5 cm) with catalyst |
|---|---|---|
| 23° C. | 178 | 1072 |
| 50° C. | 165 | 634 |
| 70° C. | 120 | 386 |

Example 3

In this example, three systems are compared: one in which the adhesive does not contain a catalyst, the second in which the adhesive contains DABCO and the third in which the adhesive contains methyl-2-imidazole (M2ID). The catalyst is added in an amount of 0.25% by weight based on adhesive weight. The adhesive/catalyst mixture is obtained by compounding the components at 130°–140° C.

Adhesion is then determined, for variable epoxy-adhesive times.

TABLE 7a

| epoxy/adhesive time 22–25 seconds | temperature | material | thickness | time |
|---|---|---|---|---|
| tube | 200° C. | — | — | — |
| layer 1 | 200° C. | epoxy 2 | 70 μm | — |
| layer 2 | 225° C. | adhesive 1 | 250–300 μm | — |
| layer 3 | 210° C. | top-coat 1 | 2.5 m | — |
| epoxy gel time at 200° C. | | | | 45 s |
| epoxy/adhesive time | — | — | — | 22–25 s |
| epoxy/cooling time | — | — | — | 90 s |

TABLE 7b

| Peel strength | | | |
|---|---|---|---|
| Temperature | Peel-off force without catalyst | (N/5 cm) with DABCO | with M2ID |
| 23° C. | 723 | 1132 | >1053 |
| 50° C. | 665 | 731 | 646 |
| 70° C. | 400 | 278 | 294 |

TABLE 8A

| epoxy/adhesive time 45 seconds | temperature | material | thickness | time |
|---|---|---|---|---|
| tube | 200° C. | — | — | — |
| layer 1 | 200° C. | epoxy 1 | 70 μm | — |
| layer 2 | 225° C. | adhesive 1 | 250–300 μm | — |
| layer 3 | 210° C. | top-coat 1 | 2.5 mm | — |
| epoxy gel time at 200° C. | | | | 45 s |
| epoxy/adhesive time | — | — | — | 45 s |
| epoxy/cooling time | — | — | — | 110 s |

TABLE 8B

| Peel strength | | | |
|---|---|---|---|
| Temperature | Peel-off force without catalyst | (N/5 cm) with DABCO | with M2ID |
| 23° C. | 278 | 1102 | >975 |
| 50° C. | 257 | 711 | 467 |
| 70° C. | 157 | 312 | 268 |

Example 4

In this example two systems are compared: one in which the adhesive does not contain a catalyst and the other in which the adhesive contains a catalyst. The catalyst is DABCO, added in an amount of 0.25% by weight based on the adhesive weight. The adhesive/catalyst mixture is obtained by compounding the components at 130°–140° C. Adhesion is then determined.

TABLE 9A

| epoxy/adhesive time 22–25 seconds | temperature | material | thickness | time |
|---|---|---|---|---|
| tube | 180° C. | — | — | — |
| layer 1 | 180° C. | epoxy 3 | 70 μm | — |
| layer 2 | 230° C. | adhesive 1 | 250–300 μm | — |
| layer 3 | 215° C. | top-coat 1 | 2.5 mm | — |
| epoxy gel time at 180° C. | | | | 40 s |
| epoxy/adhesive time | — | — | — | 22–25 s |
| epoxy/cooling time | — | — | — | 90 s |

TABLE 9B

| Peel strength | | |
|---|---|---|
| Temperature | Peel-off force without catalyst | (N/5 cm) with catalyst |
| 23° C. | 249 | >1065 |
| 50° C. | 523 | >790 |
| 70° C. | 375 | 459 |

Example 5

In this example two systems are compared: one in which the adhesive does not contain a catalyst and the other in which the adhesive contains a catalyst. The catalyst is DABCO, added in an amount of 0.25% by weight based on the adhesive weight. The adhesive/catalyst mixture is obtained by compounding the components at 130°–140° C. Adhesion is then determined.

TABLE 10A

| epoxy/adhesive time 22–25 seconds | temperature | material | thickness | time |
|---|---|---|---|---|
| tube | 180° C. | — | — | — |
| layer 1 | 180° C. | epoxy 1 | 70 μm | — |
| layer 2 | 225° C. | adhesive 2 | 250–300 μm | — |
| layer 3 | 210° C. | top-coat 2 | 2.5 mm | — |
| epoxy gel time at 180° C. | | | | 45 s |
| epoxy/adhesive time | — | — | — | 22–25 s |
| epoxy/cooling time | — | — | — | 90 s |

TABLE 10B

| Peel strength | | |
|---|---|---|
| Temperature | Peel-off force without catalyst | (N/5 cm) with catalyst |
| 23° C. | >720 | >845 |
| 50° C. | >657 | 856 |
| 70° C. | 324 | 489 |
| 80° C. | 232 | 316 |

Example 6

In this example two systems are compared: one in which the adhesive does not contain a catalyst and the other in which the adhesive contains a catalyst. The catalyst is DABCO, added in an amount of 0.25% by weight based on the adhesive weight. The adhesive/catalyst mixture is obtained by compounding the components at 130°–140° C. Adhesion is then determined.

TABLE 11A

| | epoxy/adhesive time 22–25 seconds | | | |
|---|---|---|---|---|
| | temperature | material | thickness | time |
| tube | 180° C. | — | — | — |
| layer 1 | 185° C. | epoxy 4 | 70 μm | — |
| layer 2 | 225° C. | adhesive 2 | 250–300 μm | — |
| layer 3 | 250° C. | top-coat 3 | 2.5 mm | — |
| epoxy gel time at 180° C. | | | | 38 s |
| epoxy/adhesive time | — | — | — | 22–25 s |
| epoxy/cooling time | — | — | — | 3 min |

TABLE 11B

| | Peel strength | |
|---|---|---|
| Temperature | Peel-off force without catalyst | (N/5 cm) with catalyst |
| 23° C. | 617 | 694 |
| 50° C. | 380 | 440 |
| 70° C. | 225 | 325 |

Example 7

In this example two systems are compared: one in which the adhesive does not contain a catalyst and the other in which the adhesive contains a catalyst. The catalyst is DABCO, added in an amount of 0.25% by weight based on the adhesive weight. The adhesive/catalyst mixture is obtained by compounding the components at 130°–140° C. Adhesion is then determined.

TABLE 12A

| | epoxy/adhesive time 22–25 seconds | | | |
|---|---|---|---|---|
| | temperature | material | thickness | time |
| tube | 180° C. | — | — | — |
| layer 1 | 180° C. | epoxy 5 | 70 μm | — |
| layer 2 | 230° C. | adhesive 2 | 250–300 μm | — |
| layer 3 | 250° C. | top-coat 3 | 2.5 mm | — |
| epoxy gel time at 180° C. | | | | 25 s |
| epoxy/adhesive time | — | — | — | 22–25 s |
| epoxy/cooling time | — | — | — | 3 min |

TABLE 12B

| | Peel strength | |
|---|---|---|
| Temperature | Peel-off force without catalyst | (N/5 cm) with catalyst |
| 23° C. | 329 | 780 |
| 50° C. | 290 | 637 |
| 70° C. | 240 | 363 |

Example 8

In this example two systems are compared: one in which the adhesive does not contain a catalyst and the other in which the adhesive contains a catalyst. The catalyst is M2ID, added in an amount of 0.25% by weight based on the adhesive weight.

The adhesive/catalyst mixture is obtained by compounding the components at 130°–140° C. Adhesion is then determined.

TABLE 13A

| | epoxy/adhesive time 22–25 seconds | | | |
|---|---|---|---|---|
| | temperature | material | thickness | time |
| tube | 200° C. | — | — | — |
| layer 1 | 200° C. | epoxy 2 | 70 μm | — |
| layer 2 | 235° C. | adhesive 3 | 250–300 μm | — |
| layer 3 | 250° C. | top-coat 4 | 2.5 mm | — |
| epoxy gel time at 200° C. | | | | 45 s |
| epoxy/adhesive time | — | — | — | 22–25 s |
| epoxy/cooling time | — | — | — | 3 min |

TABLE 13B

| | Peel strength | |
|---|---|---|
| Temperature | Peel-off force without catalyst | (N/5 cm) with catalyst |
| 80° C. | 825 | 1056 |
| 110° C. | 726 | 713 |

TABLE 14A

| | epoxy/adhesive time 45 seconds | | | |
|---|---|---|---|---|
| | temperature | material | thickness | time |
| tube | 200° C. | — | — | — |
| layer 1 | 200° C. | epoxy 2 | 70 μm | — |
| layer 2 | 235° C. | adhesive 3 | 250–300 μm | — |
| layer 3 | 250° C. | top-coat 4 | 2.5 mm | — |
| epoxy gel time at 200° C. | | | | 45 s |
| epoxy/adhesive time | — | — | — | 45 s |
| epoxy/cooling time | — | — | — | 3 min |

TABLE 14B

| | Peel strength | |
|---|---|---|
| Temperature | peel-off force without catalyst | (N/5 cm) with catalyst |
| 80° C. | 945 | 1005 |
| 110° C. | 679 | 730 |

Example 9

In this example, the results are given for variable amounts of catalyst (DABCO), specifically 0.05% and 0.1% DABCO, respectively.

TABLE 15A

| | epoxy/adhesive time 80 seconds | | | |
|---|---|---|---|---|
| | temperature | material | thickness | time |
| tube | 200° C. | — | — | — |
| layer 1 | 200° C. | epoxy 2 | 70 μm | — |
| layer 2 | 230° C. | adhesive 1 | 250–300 μm | — |
| layer 3 | 230° C. | top-coat 1 | 2.5 mm | — |
| epoxy gel time at 180° C. | | | | 45 s |
| epoxy/adhesive time | — | — | — | 80 s |
| epoxy/cooling time | — | — | — | 3 min |

TABLE 15B

| | Peel strength | |
|---|---|---|
| Temperature | Peel-off force 0.05% DABCO | (N/5 cm) 0.1% DABCO |
| 23° C. | 366 | >1025 |
| 50° C. | 400 | >786 |
| 70° C. | 258 | 345 |

Example 10

In this example, the results are given for catalyst (DABCO) concentrations of 0 and 0.25%, respectively.

TABLE 16A

| | epoxy/adhesive time 80 seconds | | | |
|---|---|---|---|---|
| | temperature | material | thickness | time |
| tube | 200° C. | — | — | |
| layer 1 | 200° C. | epoxy 2 | 70 μm | — |
| layer 2 | 225° C. | adhesive 1 | 250–300 μm | — |
| layer 3 | 210° C. | top-coat 1 | 2.5 mm | — |
| epoxy gel time at 180° C. | | | | 45 s |
| epoxy/adhesive time | — | — | — | 80 s |
| epoxy/cooling time | — | — | — | 3 min |

TABLE 16B

| | Peel strength | |
|---|---|---|
| Temperature | Peel-off force without catalyst | (N/5 cm) with catalyst |
| 23° C. | 178 | 1072 |
| 50° C. | 165 | 634 |
| 70° C. | 120 | 386 |

Example 11

In this example, the results are given for catalyst (DABCO) concentrations of 0 and 0.25%, respectively.

TABLE 17A

| | epoxy/adhesive time 22–25 seconds | | | |
|---|---|---|---|---|
| | temperature | material | thickness | time |
| tube | 200° C. | — | — | — |
| layer 1 | 200° C. | epoxy 2 | 70 μm | — |
| layer 2 | 235° C. | adhesive 3 | 250–300 μm | — |
| layer 3 | 250° C. | top-coat 4 | 2.5 mm | — |
| epoxy gel time at 180° C. | | | | 45 s |
| epoxy/adhesive time | — | — | — | 22–25 s |
| epoxy/cooling time | — | — | — | 3 min |

TABLE 17B

| | Peel strength | |
|---|---|---|
| Temperature | Peel-off force without catalyst | (N/5 cm) with catalyst |
| 80° C. | 925 | 1181 |
| 110° C. | 726 | 727 |

TABLE 18A

| | epoxy/adhesive time 45 seconds | | | |
|---|---|---|---|---|
| | temperature | material | thickness | time |
| tube | 200° C. | — | — | — |
| layer 1 | 200° C. | epoxy 2 | 70 μm | — |
| layer 2 | 235° C. | adhesive 3 | 250–300 μm | — |
| layer 3 | 250° C. | top-coat 4 | 2.5 mm | — |
| epoxy gel time at 200° C. | | | | 45 s |
| epoxy/adhesive time | — | — | — | 45 s |
| epoxy/cooling time | — | — | — | 3 min |

TABLE 18B

| | Peel strength | |
|---|---|---|
| Temperature | Peel-off force without catalyst | (N/5 cm) with catalyst |
| 80° C. | 945 | 1130 |
| 110° C. | 679 | 761 |

Example 12

In this example, salt water endurance ability is compared for different coatings. Metal/epoxy peal-off is determined after 1000 hours at 65° C. in 3% NaCl salt water.

It is noted that ability to withstand salt water improves as epoxy/adhesive time increases (adhesive applied after gelling time); for systems without catalyst, adhesion decreases whereas, for systems with catalyst, adhesion remains high.

The present three-layer coatings thus have a good ability to withstand water, as well as high adhesion.

Obviously, the present invention is not limited to the examples given, but may undergo numerous variations readily available to the person skilled in the art.

For example the invention also covers the embodiment in which the adhesive and thermoplastic layers are the same single layer. According to a first alternative embodiment, the adhesive and the thermoplastic are substantially of the same material, only the adhesive layer includes the catalyst. In a second alternative embodiment, the adhesive can be mixed with the thermoplastic and only form a single layer.

What is claimed is:

1. A three-layer coating on a metal surface comprising:

(i) an innermost primer layer disposed upon said metal surface;

(ii) an adhesive layer disposed upon said primer layer comprising at least one polymer and a catalyst; and (iii) an outermost thermoplastic polymer layer disposed upon said adhesive layer;

wherein the polymer of said adhesive layer consists essentially of a functionalized polymer formed by grafting or by copolymerization with at least one functional monomer chosen from the group consisting of:

(i) an unsaturated carboxylic acid:

(ii) an unsaturated dicarboxylic acid anhydride:

(iii) a derivative of an unsaturated carboxylic acid:

(iv) a derivative of an unsaturated dicarboxylic acid anhydride; and (v) an unsaturated epoxide.

2. The coating of claim 1, wherein the adhesive layer consists essentially of a copolymer of ethylene and at least one monomer selected from the group consisting of:

(i) an unsaturated carboxylic acid ester;

(ii) a vinyl ester of a saturated carboxylic acid; and (iii) an alpha-olefin.

3. The coating of claim 1, wherein the adhesive layer comprises a terpolymer consisting essentially of ethylene, an alkyl (meth)acrylate and maleic anhydride, wherein the alkyl group comprises from 1 to 4 carbon atoms.

4. The coating of claim 1, wherein the adhesive layer comprises a member of the group consisting of polyethylene grafted with maleic anhydride and polypropylene grafted with maleic anhydride.

5. The coating of claim 1, wherein the catalyst is present in an amount from 0.005% to 2.5% by weight based on the weight of the adhesive.

6. The coating of claim 3 wherein the catalyst is present in an amount from 0.005% to 2.5% by weight based on the weight of the adhesive.

7. The coating of claim 4 wherein the catalyst is present in an amount from 0.005% to 2.5% by weight based on the weight of the adhesive.

8. The coating of claim 1, wherein the catalyst is a member of the group consisting of 1,4-diazabicyclo[2,2,2] octane (DABCO) and methyl-2-imidazole (M2ID).

9. The coating of claim 5, wherein the catalyst is a member of the group consisting of 1,4-diazabicyclo[2,2,2] octane (DABCO) and methyl-2-imidazole (M2ID).

10. The coating of claim 6 wherein the catalyst is a member of the group consisting of 1,4-diazabicyclo octane (DABCO) and methyl-2-imidazole (M2ID).

11. The coating of claim 7, wherein the catalyst is a member of the group consisting of 1,4-diazabicyclo[2,2,2] octane (DABCO) and methyl-2-imidazole (M2ID).

12. The coating of claim 1, wherein the primer layer comprises an epoxy primer.

13. The coating of claim 3, wherein the primer layer comprises an epoxy primer.

14. The coating of claim 4, wherein the primer layer comprises an epoxy primer.

15. The coating of claim 8, in wherein the primer layer comprises an epoxy primer.

16. The coating of claim 1, wherein the thermoplastic polymer layer comprises a member of the group consisting of polyethylene and polypropylene.

17. The coating of claim 3, wherein the thermoplastic polymer layer comprises a member of the group consisting of polyethylene and polypropylene.

18. The coating of claim 4, wherein the thermoplastic polymer layer comprises a member of the group consisting of polyethylene and polypropylene.

19. The coating of claim 12, wherein the thermoplastic polymer layer comprises a member of the group consisting of polyethylene and polypropylene.

20. A three-layer coating on a metal surface comprising:

(i) an innermost epoxy primer layer disposed upon said metal surface;

(ii) an adhesive layer disposed upon said epoxy primer layer comprising at least one polymer and from 0.005% to 2.5% by weight of a catalyst, based on the adhesive weight; and (iii) an outermost polyethylene layer disposed upon said adhesive layer; wherein the polymer of said adhesive layer consists essentially of a terpolymer consisting essentially of ethylene, an alkyl (meth)acrylate and maleic anhydride, wherein the alkyl group comprises from 1 to 4 carbon atoms.

21. A three-layer coating on a metal surface comprising:

(i) an innermost epoxy primer layer disposed upon said metal surface;

(ii) an adhesive layer disposed upon said epoxy primer layer comprising at least one polymer and from 0.005% to 2.5% by weight of a catalyst, based on the adhesive weight; and (iii) an outermost polyethylene layer disposed upon said adhesive layer, wherein the polymer of said adhesive layer consists essentially of polyethylene grafted with maleic anhydride.

22. A three-layer coating on a metal surface comprising:

(i) an innermost epoxy primer layer disposed upon said metal surface;

(ii) an adhesive layer disposed upon said epoxy primer layer comprising at least one polymer and from 0.005% to 2.5% by weight of a catalyst, based on the adhesive weight; and (iii) an outermost polypropylene layer disposed upon said adhesive layer; wherein the polymer of said adhesive layer consists essentially of polypropylene grafted with maleic anhydride.

23. A coated metal tube, wherein a surface of the metal tube is coated with the coating of claim 1.

24. A coated metal tube, wherein a surface of the metal tube is coated with the coating of claim 20.

25. A coated metal tube, wherein a surface of the metal tube is coated with the coating of claim 21.

26. A coated metal tube, wherein a surface of the metal tube is coated with the coating of claim 22.

27. The coated metal tube of claim 23, wherein the adhesive layer is applied before the primer layer sets but after the primer layer gels.

28. The coated metal tube of claim 24, wherein the adhesive layer is applied before the primer layer sets but after the primer layer gels.

29. The coated metal tube of claim 25, wherein the adhesive layer is applied before the primer layer sets but after the primer layer gels.

30. The coated metal tube of claim 26, wherein the adhesive layer is applied before the primer layer sets but after the primer layer gels.

* * * * *